United States Patent
Vu et al.

(10) Patent No.: US 8,560,231 B2
(45) Date of Patent: Oct. 15, 2013

(54) METHOD AND APPARATUS FOR ADJUSTING DISTANCE FOR GENERATING MANEUVER INSTRUCTION FOR NAVIGATION SYSTEM

(71) Applicants: Tien Vu, Foutain Valley, CA (US); Clayton Napohaku, Lakewood, CA (US)

(72) Inventors: Tien Vu, Foutain Valley, CA (US); Clayton Napohaku, Lakewood, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 13/658,605

(22) Filed: Oct. 23, 2012

(65) Prior Publication Data

US 2013/0073204 A1 Mar. 21, 2013

Related U.S. Application Data

(63) Continuation of application No. 12/072,408, filed on Feb. 26, 2008.

(51) Int. Cl.
*G01C 21/00* (2006.01)

(52) U.S. Cl.
USPC .......................................... 701/437; 701/410

(58) Field of Classification Search
USPC .................................. 701/408, 410, 437, 438
See application file for complete search history.

(56) References Cited

U.S. PATENT DOCUMENTS

| | | | |
|---|---|---|---|
| 4,937,752 A | 6/1990 | Nanba et al. | |
| 5,410,486 A | 4/1995 | Kishi et al. | |
| 5,612,882 A | 3/1997 | LeFebvre et al. | |
| 5,737,225 A | 4/1998 | Schulte | |
| 5,757,289 A | 5/1998 | Nimura et al. | |
| 5,774,071 A | 6/1998 | Konishi et al. | |
| 5,904,728 A | 5/1999 | Tamai et al. | |
| 6,212,470 B1 | 4/2001 | Seymour et al. | |
| 6,269,304 B1 | 7/2001 | Kaji et al. | |
| 6,278,943 B1 | 8/2001 | Yamauchi | |
| 6,388,582 B2 | 5/2002 | Yamashita et al. | |
| 7,194,355 B2 | 3/2007 | Omi | |
| 7,502,685 B2 | 3/2009 | Nakamura | |
| 8,275,542 B2 * | 9/2012 | Adachi et al. | 701/400 |
| 8,306,743 B2 * | 11/2012 | Komatsu et al. | 701/437 |
| 8,315,796 B2 * | 11/2012 | Yamaguchi et al. | 701/437 |
| 8,326,529 B2 * | 12/2012 | Kang | 701/437 |
| 8,335,641 B2 * | 12/2012 | Nakayama et al. | 701/408 |
| 8,335,645 B2 * | 12/2012 | Sakamoto | 701/440 |
| 8,340,894 B2 * | 12/2012 | Yester | 701/301 |
| 8,346,465 B2 * | 1/2013 | Panganiban et al. | 340/988 |

(Continued)

FOREIGN PATENT DOCUMENTS

| | | |
|---|---|---|
| JP | 07-049243 | 2/1995 |
| JP | 07-272198 | 10/1995 |
| WO | WO 2006/068268 | 6/2006 |

*Primary Examiner* — Helal A Algahaim
(74) *Attorney, Agent, or Firm* — Muramatsu & Associates

(57) ABSTRACT

A distance adjustment method and apparatus for a navigation system produces a maneuver instruction for an intersection at the most appropriate timing and location during the route guidance. The method includes the steps of: searching an upcoming intersection on the calculated route that requires the user to make a turn therein; retrieving data concerning the upcoming intersection from a map database; adjusting a final distance from a reference point of the intersection by evaluating the retrieved data concerning the intersection; and generating a maneuver instruction at a timing when the user has reached the adjusted final distance from the reference point of the intersection, thereby notifying the user to make a turning maneuver at the intersection.

18 Claims, 12 Drawing Sheets

(56) References Cited

U.S. PATENT DOCUMENTS

| | | |
|---|---|---|
| 2004/0186663 A1 | 9/2004 | Irie |
| 2005/0171694 A1 | 8/2005 | Schirmer et al. |
| 2005/0261831 A1 | 11/2005 | Irie |
| 2006/0009904 A1 | 1/2006 | Sakashita et al. |
| 2006/0235607 A1 | 10/2006 | Nakashima |
| 2007/0050133 A1 | 3/2007 | Yoshikawa et al. |
| 2012/0136570 A1* | 5/2012 | Yamashita et al. ............ 701/437 |

* cited by examiner

Fig. 1A
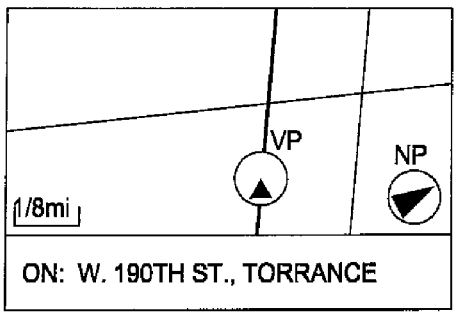
Fig. 1B
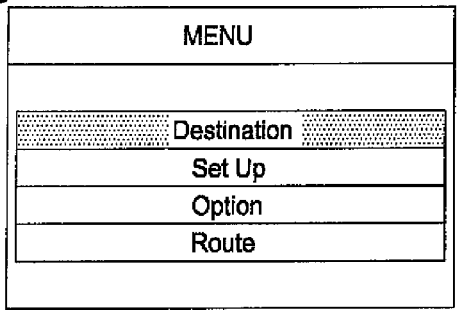
Fig. 1C
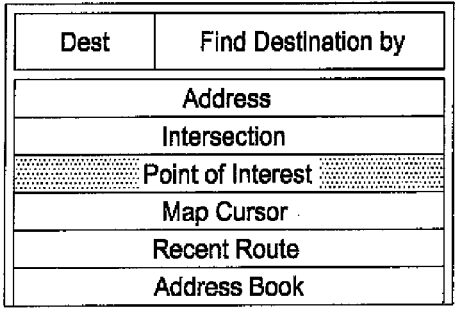
Fig. 1D
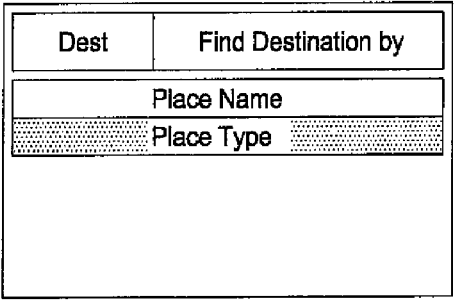
Fig. 1E
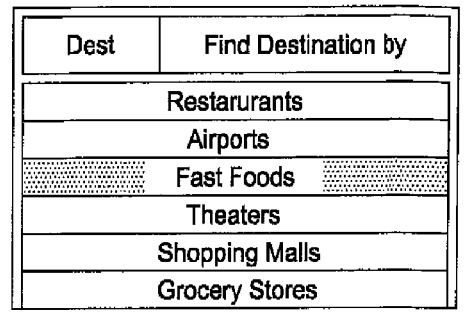
Fig. 1F
| Fast Foods | Hit 397 |
|---|---|
| Burger King | 1.23mi |
| Carl's Jr. | 1.45mi |
| Kentucky Fried Chicken | 1.69mi |
| Pizza Hut | 2.21mi |
| Del Taco | 2.67mi |
Fig. 1G
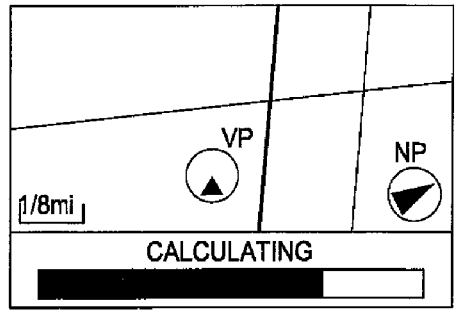
Fig. 1H
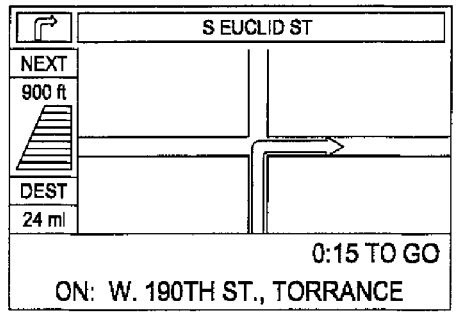

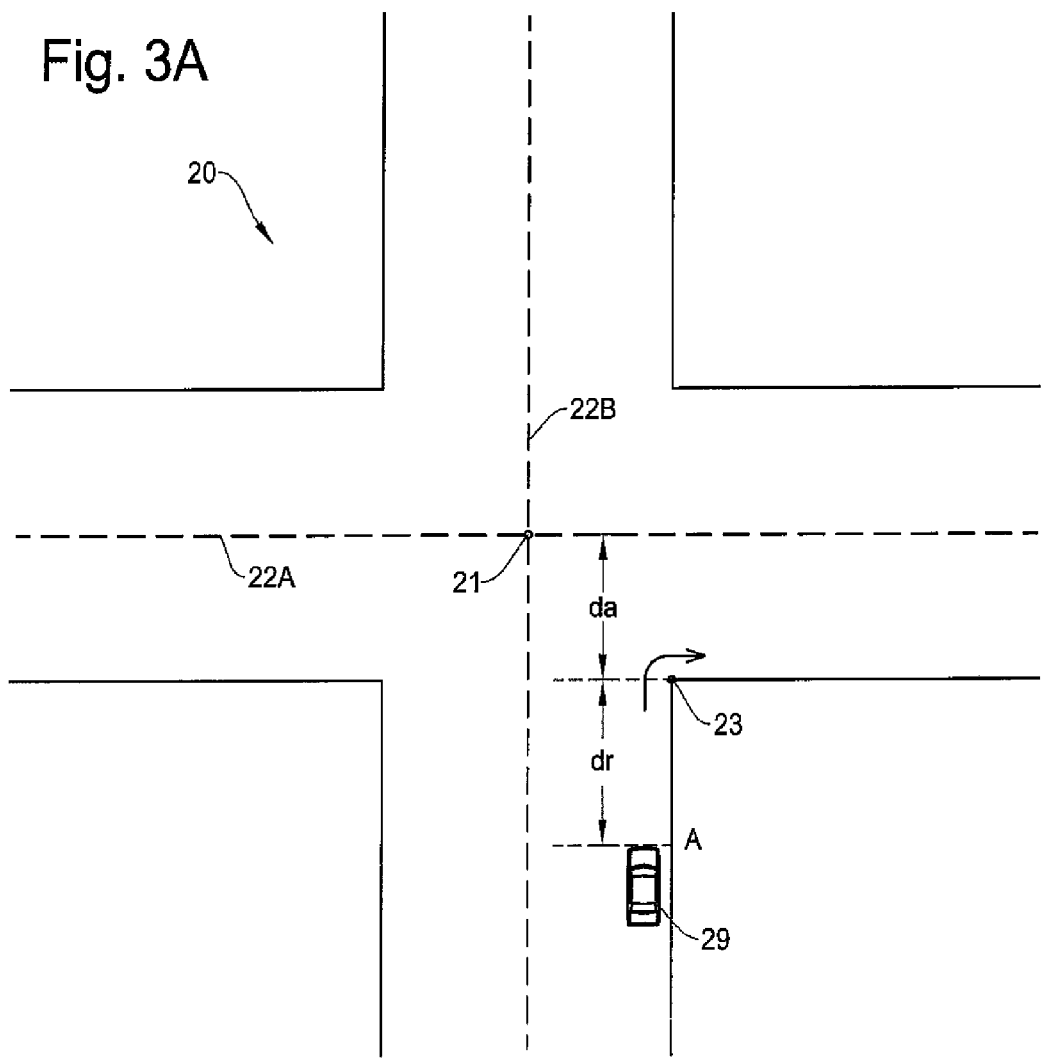

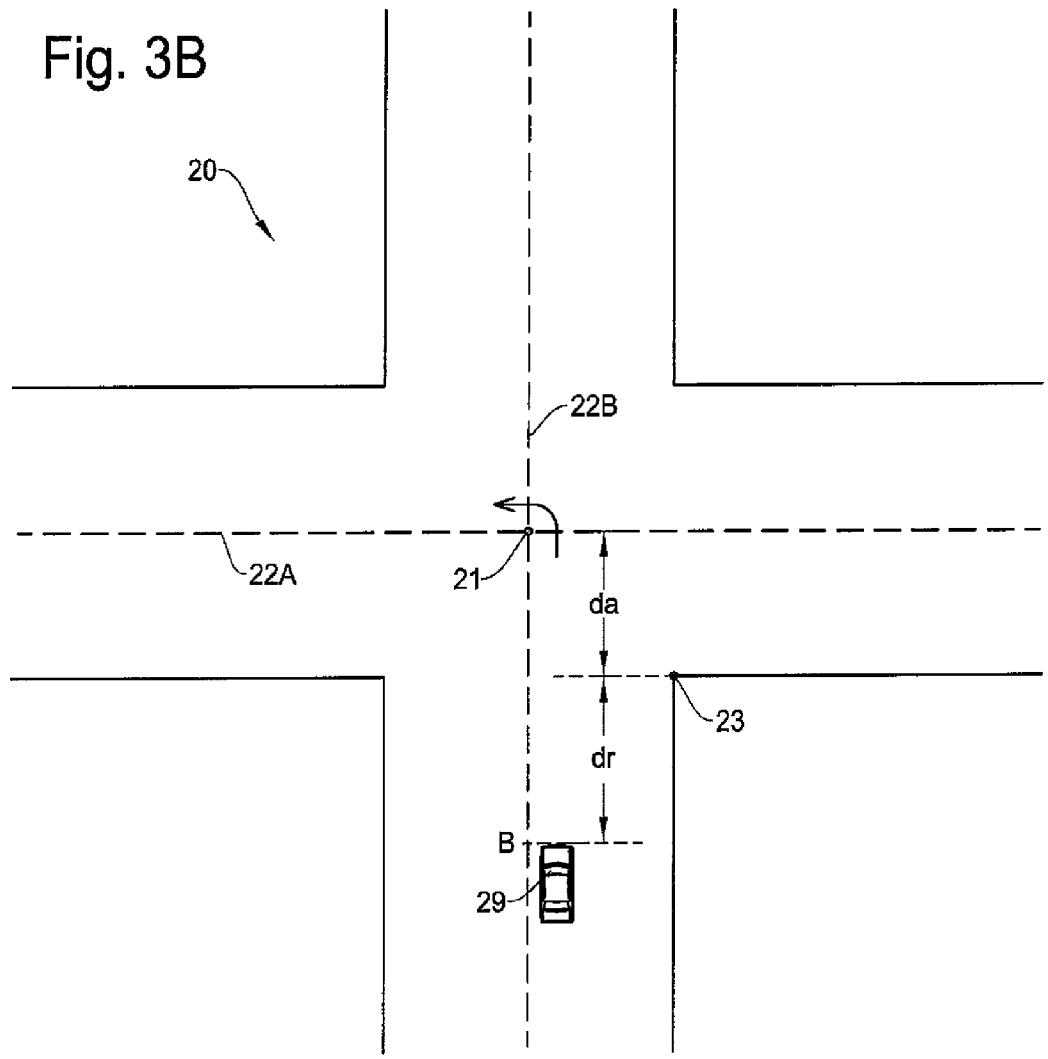

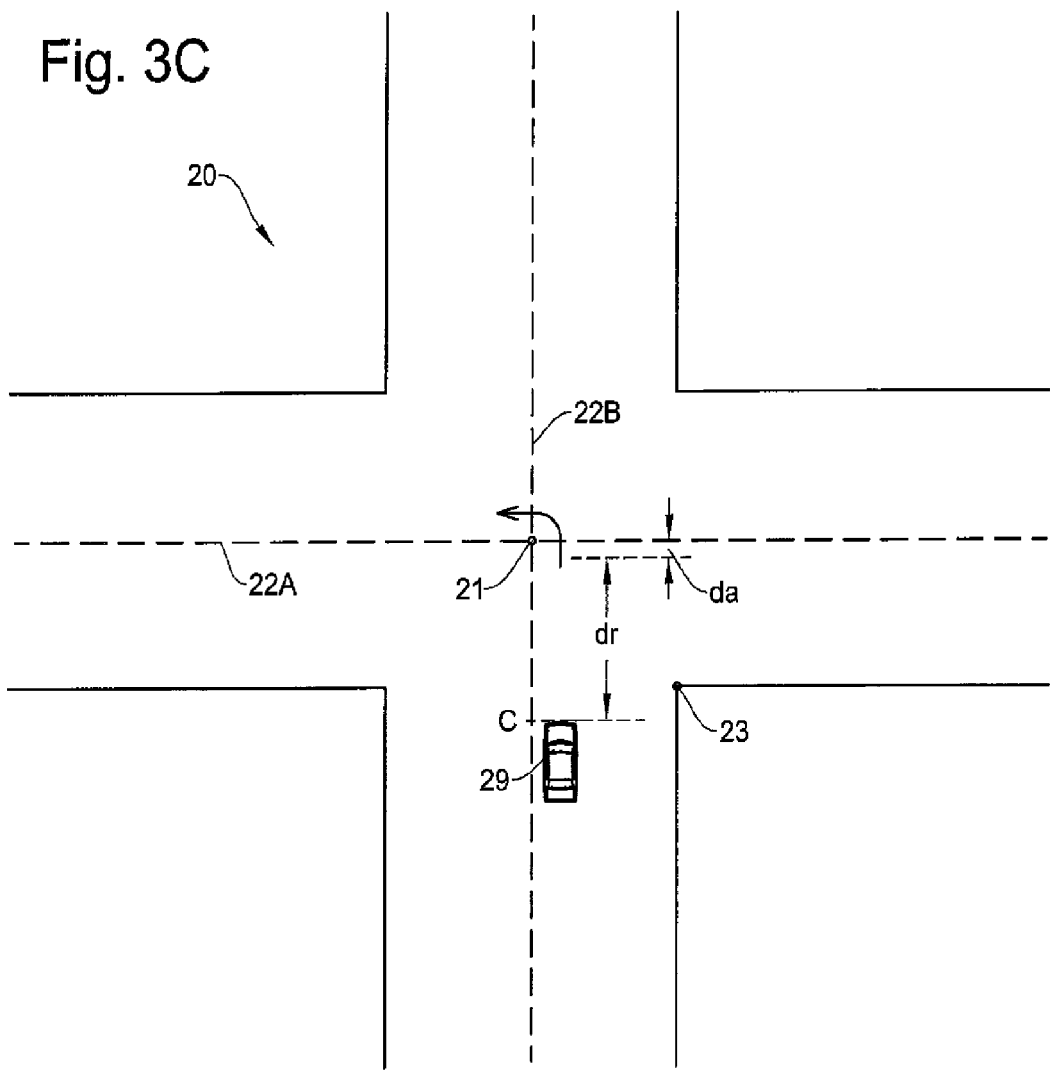

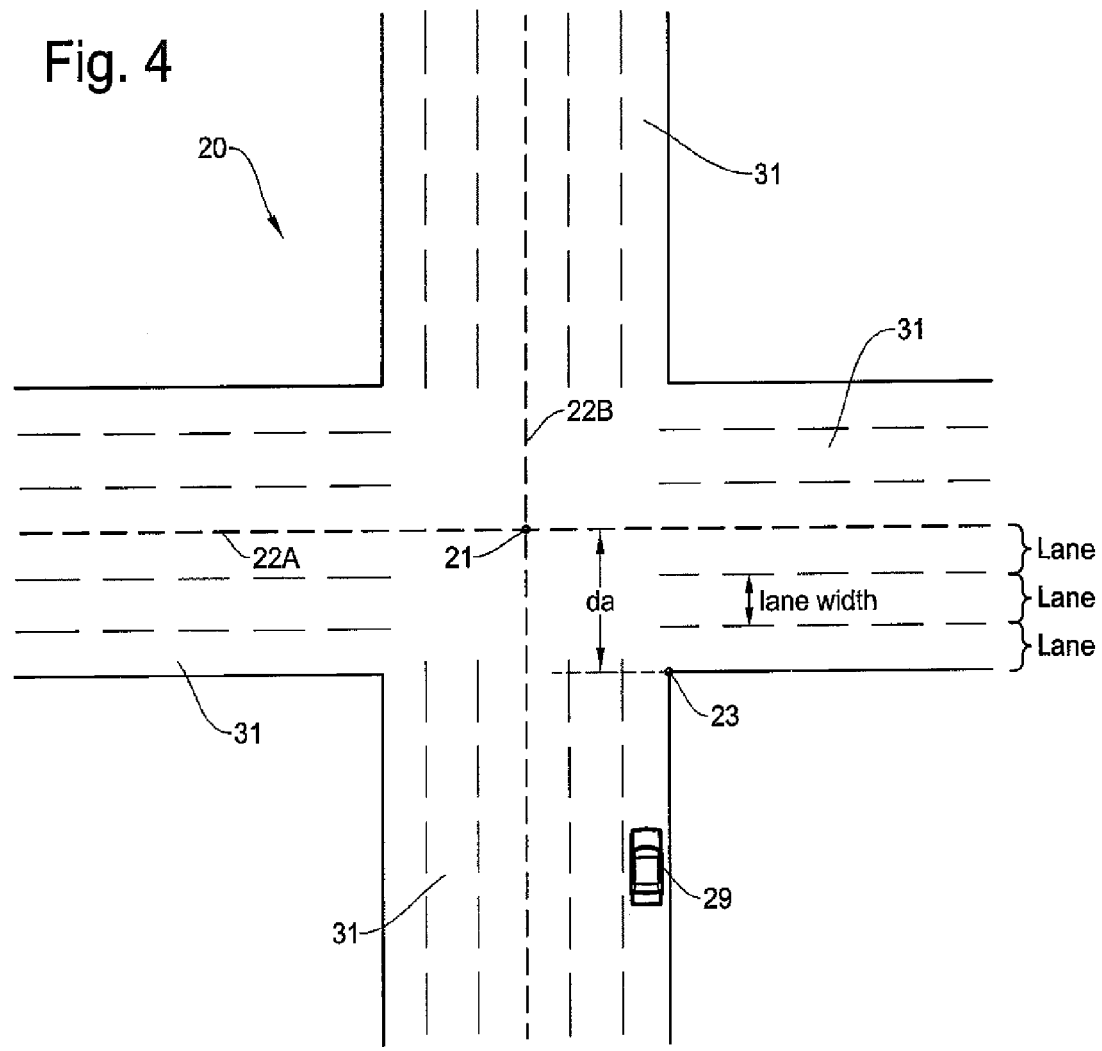

METHOD AND APPARATUS FOR ADJUSTING DISTANCE FOR GENERATING MANEUVER INSTRUCTION FOR NAVIGATION SYSTEM

FIELD OF THE INVENTION

This invention relates generally to a method and apparatus for generating an instruction for turning at an intersection, and more particularly, to a method and apparatus of distance adjustment to improve accuracy in the timing of announcing or otherwise notifying a turning maneuver to a user by a navigation system with respect to a particular intersection by evaluating various factors involved in the intersection.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), a hard disc, or from a remote data server.

FIGS. 1A-1H show a typical example of overall procedure and screen display involved in the navigation system. FIG. 1A shows an example of locator map screen of the navigation system when the destination is not specified. A process for specifying a destination typically starts through a main menu screen of FIG. 1B which displays menu items including a "Destination" menu for entering the destination. When selecting "Destination" in FIG. 1B, the navigation system displays a screen of FIG. 1C for specifying an input method for selecting the destination.

By selecting, for example, a "Point of Interest" method in FIG. 1C, the navigation system displays selection methods of point of interest (POI) either by "Place Name" or "Place Type" in FIG. 1D. If the "Place Type" is selected in FIG. 1D, the navigation system lists categories of POIs as shown in FIG. 1E through which the user selects a desired category of POIs from the lists.

FIG. 1F shows a screen when the user has selected a "Fast Foods" category in the example of FIG. 1E. Then, the screen lists names of the fast food restaurants typically sorted by distance from the current position of the user. If the user selects a particular fast food restaurant from the list, the navigation system calculates a route to the destination as shown in FIG. 1G.

After determining the route, the navigation system starts the route guidance operation. As shown in FIG. 1H, the navigation system shows the intersection for instructing the next turn and a direction of the turn. Typically, such an instruction to turn will be made by a highlighted arrow or large characters on the screen as well as by a voice announcement when the vehicle approaches to within a predetermined distance to the intersection.

However, a distance to the maneuver point of the intersection may not be appropriate with respect to a timing of announcing the maneuver action depending on circumstances of the intersection. For example, inaccuracy of such distance or timing is caused by a digitization method used in the map data where a maneuver point is defined as a crossing point of center lines. The problem associated with such a conventional method is described with reference to FIGS. 2A and 2B.

FIGS. 2A and 2B show a case where a vehicle 29 is to make a right turn at an intersection 20 where a crossing point 21 is a reference point for determining a distance to the maneuver point. In the case of FIG. 2A, an intersection 20a has a large size because each cross street has three lanes at each side. In the case of FIG. 2B, an intersection 20b has a small size because each cross street has only one lane at each side.

In the example of FIG. 2A, when the vehicle 29 approaches the intersection, an actual point for making a right turn is a corner point 23. However, since the timing of announcing the maneuver is determined based on the distance from the reference point 21, such announcement of "Make a Right Turn" may be made when the vehicle is already at or very close to the corner point 23. Such a maneuver instruction is too sudden and surprises the driver and adversely affects the safe driving.

More specifically, as shown in FIG. 2A, the crossing (reference) point 21 is established by two center lines of the streets that form the intersection 20a. The distance represented by "dr" in FIG. 2A is a reference distance between the crossing point 21 and the vehicle 29. In the conventional technology, the reference distance "dr" is predetermined such as 40 feet so that when a vehicle reached this distance range from a crossing point 21, the navigation system produces the maneuver instruction.

The conventional technology may work well if an intersection is small as in the case of the intersection 20b shown in FIG. 2B. However, if an intersection is large as in the case of FIG. 2A, the fixed reference distance "dr" causes the problem as noted above. As a result, the instruction to turn maneuver may come too late, which fails to leave enough time for the driver to make the maneuver securely. In the worst case, such an instruction for maneuver may not be produced even when the vehicle is already within the intersection, which may scare the driver and seriously impede the safe driving.

Therefore, there is a need of a new method and apparatus for navigation system to produce the maneuver instruction such as voice announcement at a more appropriate timing. There is need of a new method and apparatus for navigation system to produce the maneuver instruction at an appropriate timing even when the size and structure of the intersection, directions of turn, etc. vary.

SUMMARY OF THE INVENTION

It is, therefore, an object of the present invention to provide a distance adjustment method and apparatus for a navigation system which is capable of producing a maneuver instruction for an intersection at the most appropriate timing and location.

It is another object of the present invention to provide a distance adjustment method and apparatus for a navigation system which adjusts a distance from the reference point of the intersection to the point where the turn instruction will be made by evaluating various factors including a direction of turn, a structure and size of the intersection, etc.

It is a further object of the present invention to provide a distance adjustment method and apparatus for a navigation system which adjusts a distance from the reference point of the intersection to the point where the turn instruction will be made by evaluating various factors including a number of lanes, a width of a lane, size of a center divider, etc.

One aspect of the present invention is a distance adjustment method for a navigation system for announcing a maneuver instruction at the most appropriate timing. The method includes the steps of: conducting a route guidance operation of the navigation system for guiding a user to a destination through a calculated route; searching an upcoming intersection on the calculated route that requires the user to make a turn therein within a predetermined distance range ahead from a current position; retrieving data concerning the upcoming intersection from a map database; adjusting a final distance from a reference point of the intersection by evaluating the retrieved data concerning the intersection; and generating a maneuver instruction at a timing when the user has reached the adjusted final distance from the reference point of the intersection, thereby notifying the user to make a turning maneuver at the intersection.

In the distance adjustment method of the present invention, the final distance from the reference point of the intersection is adjusted depending on a direction of the turning maneuver at the intersection. Further, the final distance from the reference point of the intersection is adjusted depending on a direction of the turning maneuver at the intersection and a number of lanes involved in the intersection with use of the retrieved data concerning the intersection. Furthermore, in the distance adjustment method of the present invention, the final distance from the reference point of the intersection is adjusted depending on a direction of the turning maneuver at the intersection and a number of lanes involved in the intersection and a width of each lane with use of the retrieved data concerning the intersection.

The distance adjustment method of the present invention further includes a step of retrieving a reference distance from the reference point of the intersection, a step of obtaining an adjusted distance based on a direction of the turning maneuver at the intersection and other relevant information derived from the retrieved data concerning the intersection, and a step of combining the reference distance and the adjusted distance to obtain the final distance.

In the distance adjustment method, the step of obtaining the adjusted distance includes a step of detecting a number of lanes involved in the intersection and a width of each lane from the retrieved data, and a step of multiplying the number of lanes and the width of the lane.

The distance adjustment method of the present invention further includes a step of retrieving a reference distance from the reference point of the intersection, and a step of changing the reference distance based on a direction of the turning maneuver at the intersection and other relevant information derived from the retrieved data concerning the intersection thereby determining the final distance from the reference point.

In distance adjustment method of the present invention, the step of changing the reference distance for determining the final distance includes a step of incorporating a half width of a road segment where one road segment is involved in the intersection, and a step of either adding or subtracting the half width from the reference distance depending on the direction of the turning maneuver.

Further, the step of changing the reference distance for determining the final distance includes a step of incorporating a half width of a road segment where one road segment is involved in the intersection, a step of incorporating a half width of a center divider of the intersection, and a step of either adding or subtracting the half width of the road segment and the center divider from the reference distance depending on the direction of the turning maneuver.

In the distance adjustment method of the present invention, the reference distance is modified by evaluating various factors including a vehicle speed, traffic congestion, and weather condition.

Another aspect of the present invention is a distance adjustment apparatus for a navigation system to generating a maneuver instruction at the most appropriate timing by implementing the various steps of the display method described above. The distance adjustment apparatus of the present invention adjusts a distance from the reference point of the intersection to the point where the turn instruction will be made by evaluating various factors including a direction of turn, a structure and size of the intersection, a number of lanes, a width of a lane, size of a center divider, etc.

According to the present invention, the navigation system is able to produce the maneuver instruction for the intersection at the most appropriate timing. During the route guidance operation, the method and apparatus of the present invention adjusts a distance from the reference point of the intersection to the point where the turn instruction will be made by evaluating the information. Such information includes a type of an intersection, a size of the intersection such as a number of lanes, a shape or size of a center divider if any, and a direction of turn such as right turn or left turn, a speed of a vehicle, weather condition, etc. In one embodiment, in addition to the reference distance "dr" incorporated in the conventional technology, the present invention utilizes the adjusted distance "da" so that the maneuver instruction is produced when the vehicle reaches the final distance "dr+da" from the reference point. In another embodiment, a specific structure concerning a double-digitized road and its associated data such as a center divider are incorporated to determine the adjusted final distance. Thus, the driver is informed to make a turn sufficiently prior to reach the turning point of the intersection but is not too early until reaching the turning point.

BRIEF DESCRIPTION OF THE DRAWINGS

FIGS. 1A-1H are schematic diagrams showing an example of operational process and screen display involved in the navigation system for selecting a destination, determining a calculated route to the destination, and conducting a route guidance operation to the destination.

FIGS. 3A-3C are schematic diagrams showing an example of basic concept of the present invention to solve the problems arise in the intersection of FIG. 2 where FIG. 3A shows an adjusted distance "da" for the case of right turn, where FIG. 3A shows a problem arises in left turn when the same adjusted distance "da" is used, and FIG. 3C shows the situation of left turn where the distance "da" is adjusted based on the size of the intersection.

FIG. 4 is a schematic diagram showing an example of intersection to illustrate a method for determining an adjusted distance "da" shown in FIGS. 3A and 3C for producing a maneuvering instruction with a more appropriate timing under the present invention.

DETAILED DESCRIPTION OF THE PREFERRED EMBODIMENT

The method and apparatus for adjusting a distance between a reference point and an announcement point thereby producing a maneuver instruction at an appropriate timing is explained in detail with reference to the accompanied drawings. The present invention is designed to produce a maneuver instruction, typically, voice announcement of "Make a Right Turn", "Make a Left Turn", etc. at an appropriate timing, i.e., not too late and not too early. During the route guidance operation, the method and apparatus of the present invention adjusts a distance from the reference point of the intersection to the point where the turn instruction will be made by evaluating the information on a type of an intersection, a size of the intersection such as a number of lanes, a shape or size of a center divider if any, and a direction of turn such as right turn or left turn, a speed of a vehicle, weather condition, etc.

Thus, the navigation system of the present invention is able to provide the maneuver instruction at an appropriate timing for a driver corresponding to particular conditions of the intersection. Thus, the driver is informed to make a turn sufficiently prior to reach the turning point of the intersection but is not too early until reaching the turning point. The navigation system achieves this effect by adjusting the timing or distance from the reference point for announcing the maneuver instruction by evaluating the various factors obtained from the existing and future map database incorporated in the navigation system.

It should be noted that the present invention is described herein mainly for the case where the display method and apparatus is applied to a vehicle navigation system for an illustration purpose. However, the method and apparatus under the present invention can be implemented to other devices with the navigation function, such as cellular phones, portable data terminals, laptop computers, or personal computers.

Figure 2A:
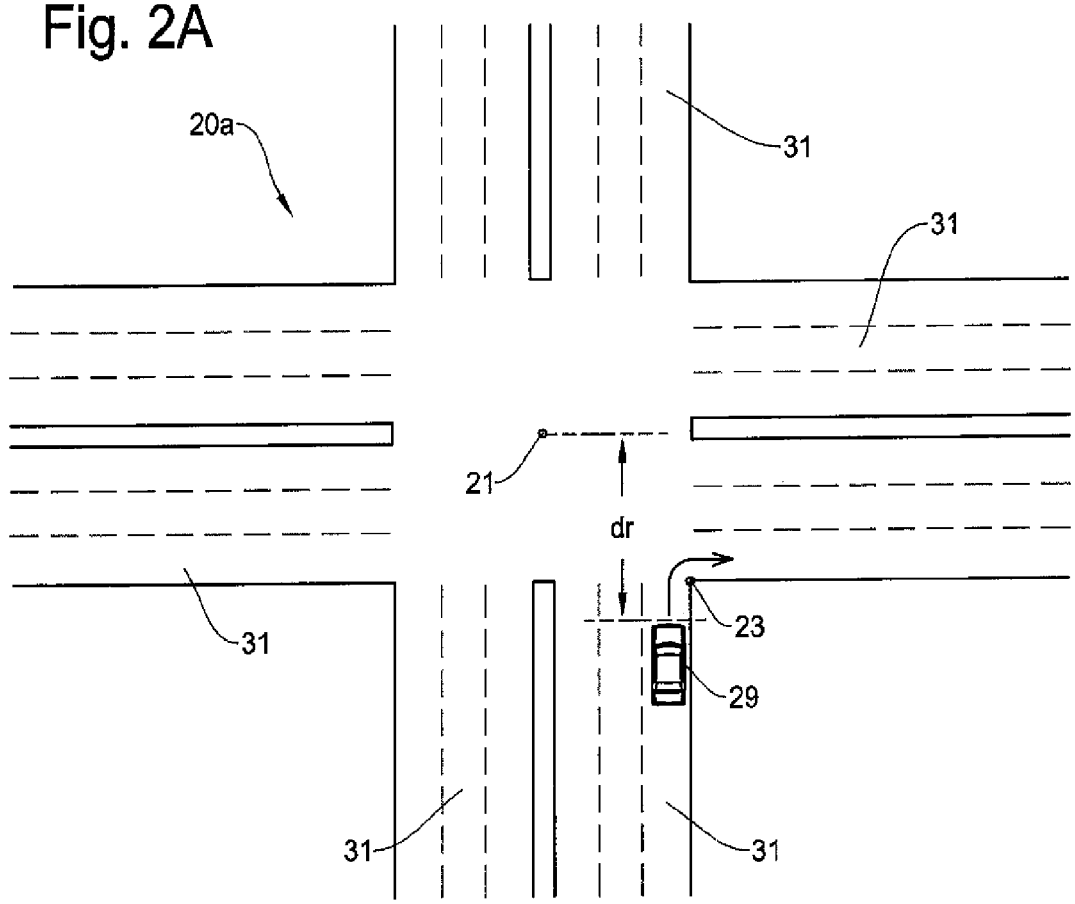
FIGS. 2A and 2B are schematic diagrams showing situations involving the problem arises in the conventional technology for producing a maneuver instruction at an intersection where an intersection has a large size with many lanes in FIG. 2A and an intersection has a small size with one lane in FIG. 2B.
Figure 2B:
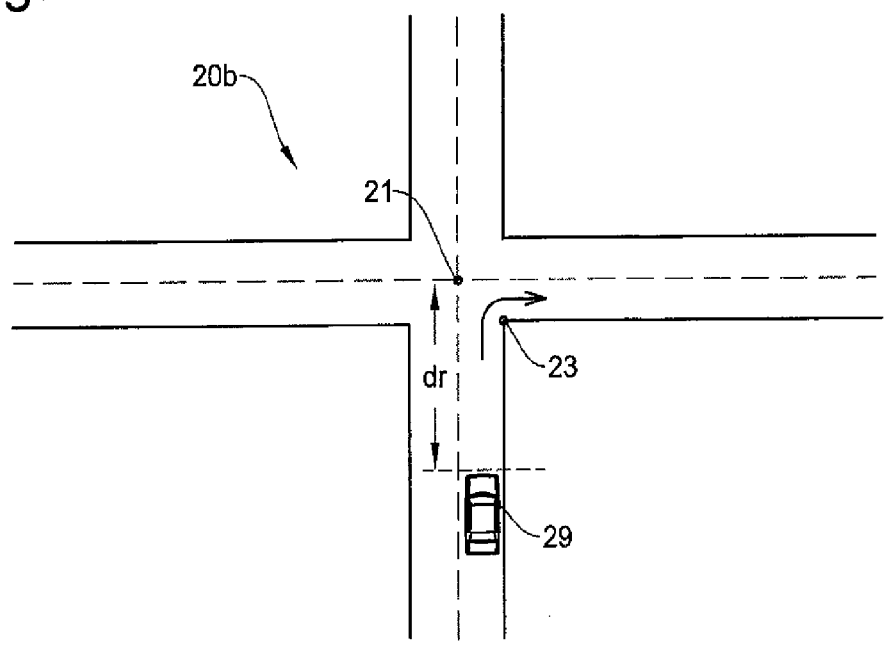

FIGS. 3A-3C are schematic diagrams showing an example of basic concept of the present invention to solve the problems arise in the intersection of FIG. 2. FIG. 3A shows an adjusted distance "da" for the case of right turn in addition to the traditional reference distance "dr". FIG. 3B shows a problem arises in making a left turn when the same adjusted distance "da" shown in FIG. 3B is used. FIG. 3C shows the situation of making a left turn where the distance "da" is adjusted based on the size of the intersection to solve the problem of FIG. 3B.

In the example of FIGS. 3A-3C, in addition to the reference distance "dr" incorporated in the conventional technology, the present invention utilizes the adjusted distance "da". As noted above, the reference distance "dr" is a predetermined distance such as 40 feet which is so designed that when the vehicle has reached this distance range from a reference (crossing) point, the navigation system produces the maneuver instruction in the conventional technology. While the reference distance "dr" is basically the same as in the conventional technology, the adjusted distance "da" varies depending on the size and structure of the intersection, the direction of turn, etc.

In the example of FIGS. 3A-3C, the reference (crossing) point 21 is used as a reference for determining a timing (distance) for generating the maneuver instruction such as "Make a Right Turn". Similar to the situation of FIG. 2, the diagram of FIG. 3A shows the case where the driver of the vehicle 29 is going to make a right turn at the intersection 20. Also similar to the situation of FIG. 2, since the vehicle 29 is on the rightmost lane, the vehicle has to make the right turn in the intersection 20 immediately after passing the corner point 23.

In the present invention, the adjusted distance "da" is added to the reference distance "dr" so that the maneuver instruction such as "Make a Right Turn" is generated at a location A which is a final distance (sum of distances da+dr) away from the reference point 21. The location A will be, for example, about 30 feet away from the corner point 23 which is a point for the right turn. As a consequent, the navigation system allows the user to be well prepared for the maneuver and to make a right turn safely and comfortably at the corner point 23.

FIG. 3B shows the case where the driver of the vehicle 29 is going to make a left turn at the intersection 20, and the vehicle 29 is now on the leftmost lane. In this situation, the vehicle has to make the left turn immediately after passing the reference point 21. In this example, it is assumed that the same adjusted distance "da" as that of FIG. 3A is added to the reference distance "dr" so that the maneuver instruction such as "Make a Left Turn" is generated at a location B (sum of distances da+dr). Since the reference point 21 is far away from the current vehicle position 29, the maneuver instruction is too early for the user, i.e., not a good timing in this situation.

FIG. 3C shows the way for solving the problem involved in the example of FIG. 3B where the driver of the vehicle 29 is going to make a left turn at the intersection 20, and the vehicle 29 is now on the leftmost lane. In this example, the adjusted distance "da" is changed from that of FIG. 3A in taking the size and structure of the intersection 20, the direction of turn, and the vehicle speed, etc., into consideration. As shown, because there is a relatively long distance between the start point of the intersection (ex. corner point 23) and the center line 22A, the adjusted distance "da" is greatly reduced from that of FIG. 3A. Accordingly, the navigation system generates the maneuver instruction such as "Make a Left Turn" at a location C which is a final distance (sum of distances da+dr), and which is an appropriate timing, i.e, not too late and not too early.

FIG. 4 is a schematic diagram showing an example of intersection to illustrate a method for determining an adjusted distance "da" shown in FIGS. 3A and 3C for producing a maneuvering instruction with a more appropriate timing under the present invention. Based on the information related to a particular intersection, the method of the present invention adjusts a distance (timing) for producing a maneuver instruction with a more appropriate timing. In the example of FIG. 4, each cross street involving the intersection has three lanes 31 for each side of opposite direction.

The information on the number of lanes can be obtained from the map database which is stored in a storage medium such as DVD, HD (hard disc), etc. of the navigation system. The information on the number of lanes may not be sufficiently provided in the today's map database but will be fully provided in the map database of near future. A width of each lane is given in the map database, or known by a person of ordinary skill in the art, or can be estimated relatively accurately according to the information such as functional classes of the road segments.

In this example, a size of a cross street is determined by a number of lanes and a width of each lane, for example, 10 feet. Thus, in the case where the number of lanes is 3, and the width of each lane is 10 feet, the total distance (width) of the cross street at one side is calculated by 3 multiplied by 10 feet, which results in 30 feet. Thus, in determining the overall distance to a maneuvering point, the reference distance "dr" is offset by the adjusted distance "da" which is 30 feet in this case.

The lane width may not be limited to a particular value but may vary between street to street. For example, the lane width may be different according to the type of the street or functional class, such as a residential street, a main street or a street in an industrial area, etc. Thus, for adjustment of the distance in the present invention, for a larger street, a wider width is assigned while a narrower width is assigned to a smaller street.

Thus, in the example of FIG. 4, the adjusted distance "da" is the sum of width of three lanes 31, which starts from the reference point 21. As noted above, the reference point 21 is the crossing point of the center lines 22A and 22B of the two cross streets. As shown in the examples of FIGS. 3A and 3C, the adjusted distance "da" will be changed depending on whether the vehicle is going to make a right turn or left turn, vehicle speed, etc.

Figure 5:
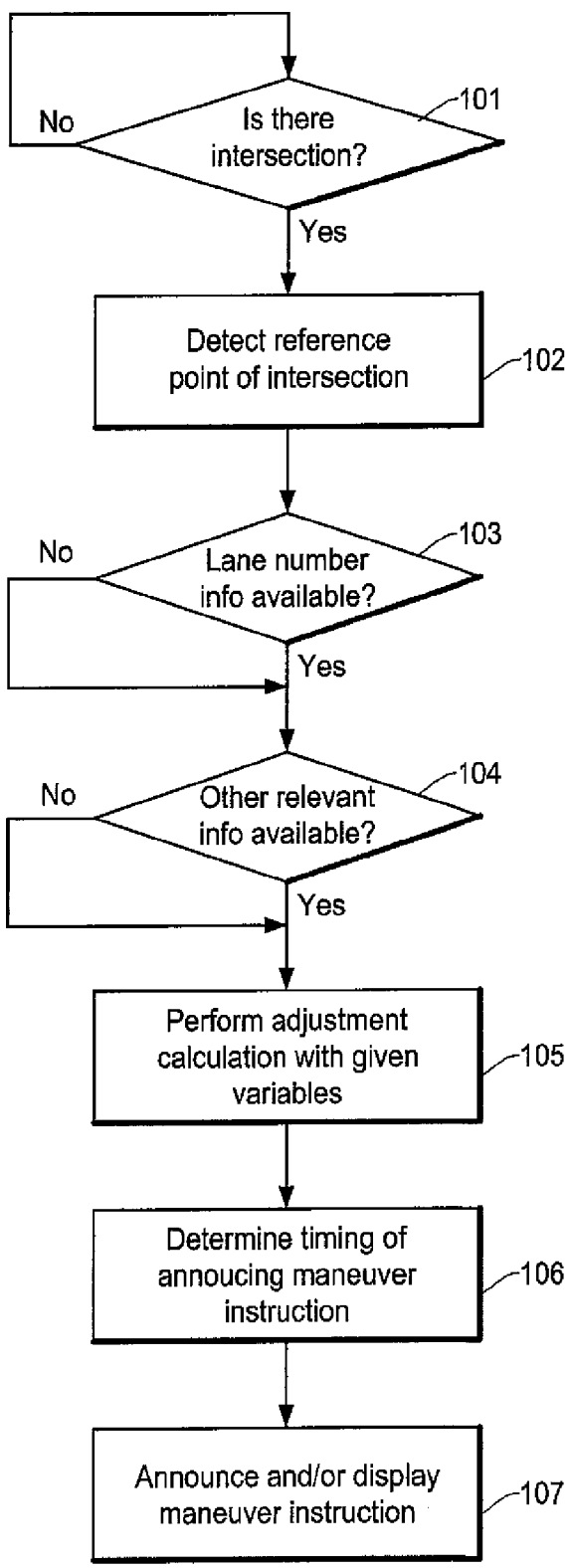
FIG. 5 is a flow chart showing an example of operational steps for adjusting a distance between a reference point and an announcement point in the situation shown in FIGS. 3A and 3C under the present invention.

FIG. 5 is a flow chart showing an example of operational steps for adjusting a distance between a reference point and an announcement point in the situation shown in FIGS. 3A and 3C under the present invention. As noted above, the process of the present invention for adjusting the timing of announcing the maneuver instruction is conducted during the route guidance operation. Thus, the operation shown by FIG. 5 will be carried out when the navigation system or a device with a navigation function is in the route guidance mode in guiding the user to the selected destination through he calculated route.

As noted above, the process of FIG. 5 is directed to the method of the present invention for adjusting the timing (distance) for producing the maneuver instruction such as by voice announcement and/or mark, etc. at an intersection. In the first step 101, the navigation system determines whether there is an intersection that requires the user to make a turn on the calculated route to reach the destination. Such determination is made for a predetermined distance range of the calculated route to the destination ahead of the current vehicle position.

The step 101 will be repeated until an intersection will be found, and if it is determined that there is an intersection, the navigation system detects a reference point of the intersection in the step 102. Typically, the reference point is a center point of the intersection such as the point 21 in FIGS. 3A-3C which is defined as a crossing point of the center lines 22A and 22B of the cross streets involving the intersection 20. Such a reference point is typically a connection point of two road segments (links) defined in the map data, and an absolute location of the reference point can be obtained as a form of longitude and latitude data from the map database.

As noted above, in the example of FIGS. 3A-3C, the reference point is used for establishing an appropriate distance from a vehicle position to announce the maneuver instruction for the intersection. In the step 103, the navigation system will check the map database to see whether information concerning a lane number is available. If it is available, the navigation system will retrieve the lane number information and temporarily stores the information in a memory to be used for adjustment calculation and will proceed to the next step.

As noted above, information concerning a lane number may not be complete in the currently marketed map database but will be fully available in the near future. If the lane number information is not available from the map database, the procedure will simply proceed to the next step. During this process, if lane number information is unavailable, the navigation system may assume the lane number based on the type and road class of the cross street.

In the next step 104, the navigation system will check whether other relevant information is available from the map database. The information relevant to the distance adjustment of the present invention may include a structure of cross street (whether there is a center divider, a width of each lane, etc.), a functional (road) class of street (major street, residential street, etc.), a current speed of the vehicle, a direction of turn at the intersection, etc. After obtaining all the relevant information in the steps 103 and 104, the navigation system performs a calculation operation in the step 105.

In the calculation operation in the step 105, the navigation system incorporates the lane number and the lane width to determine an overall distance from the reference point to the entrance point of the intersection. As will be described later, if the intersection (cross street) includes a center divider, the size and shape of such a center divider will be incorporated in the calculation. Through the calculation operation, the navigation system determines the adjusted distance "da" described above with reference to FIGS. 3A-3C which may be varied depending on the direction of turn (right or left).

Based on the calculation operation in the step 105, the navigation system determines the timing of announcing the maneuver instruction in the step 106. In the example of FIGS. 3A-3C, the timing (final distance) is determined by adding the adjusted distance "da" to the reference distance "dr". Finally, in the step 107, the navigation system produces the maneuver instruction by voice announcement and/or displaying a mark, icon, etc. at the timing determined above.

Figure 6A:
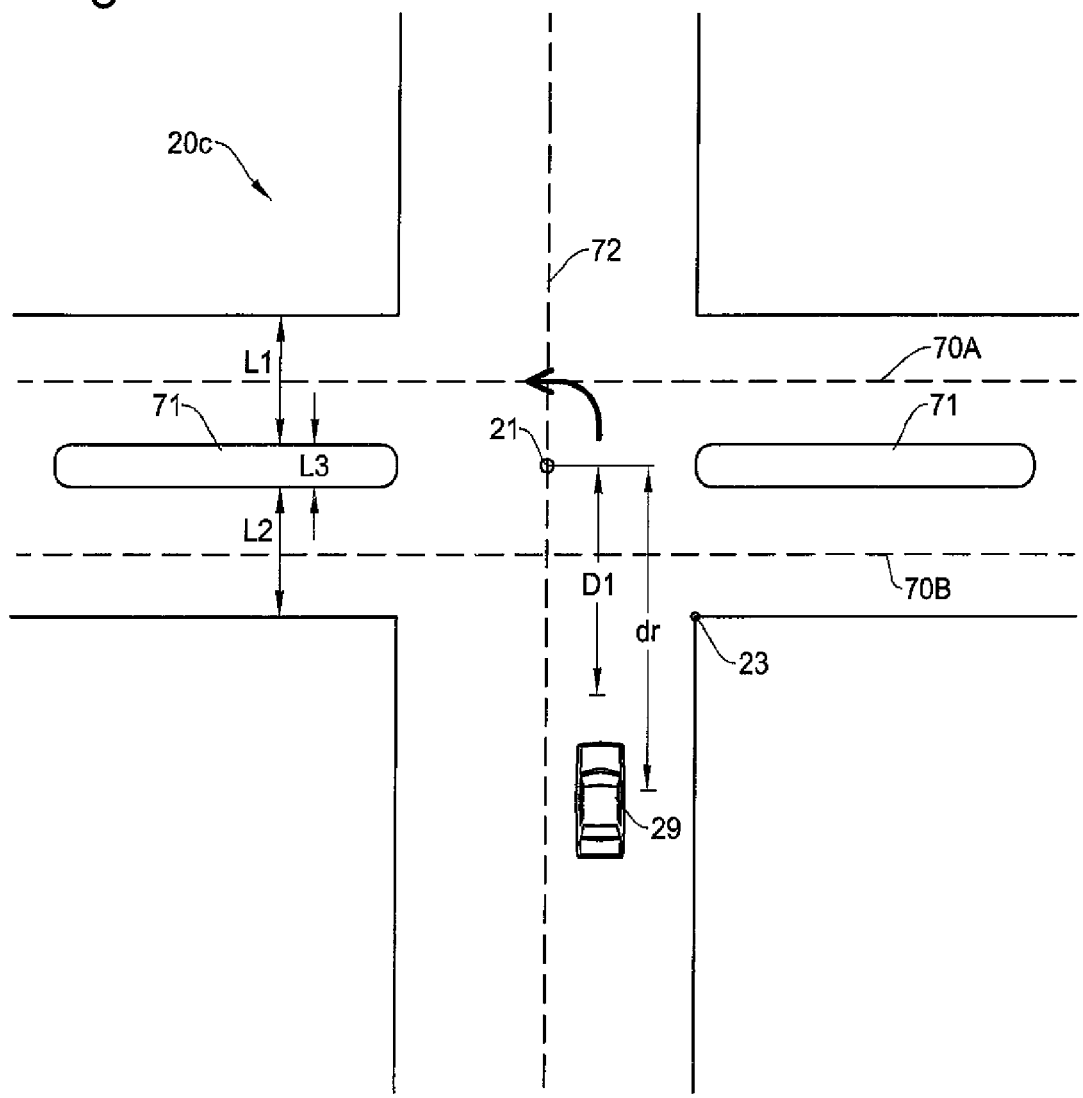
FIGS. 6A and 6B a schematic view showing another example of intersection to illustrate a method for adjusting a distance for producing a maneuvering instruction with a more appropriate timing under the present invention.
Figure 6B:
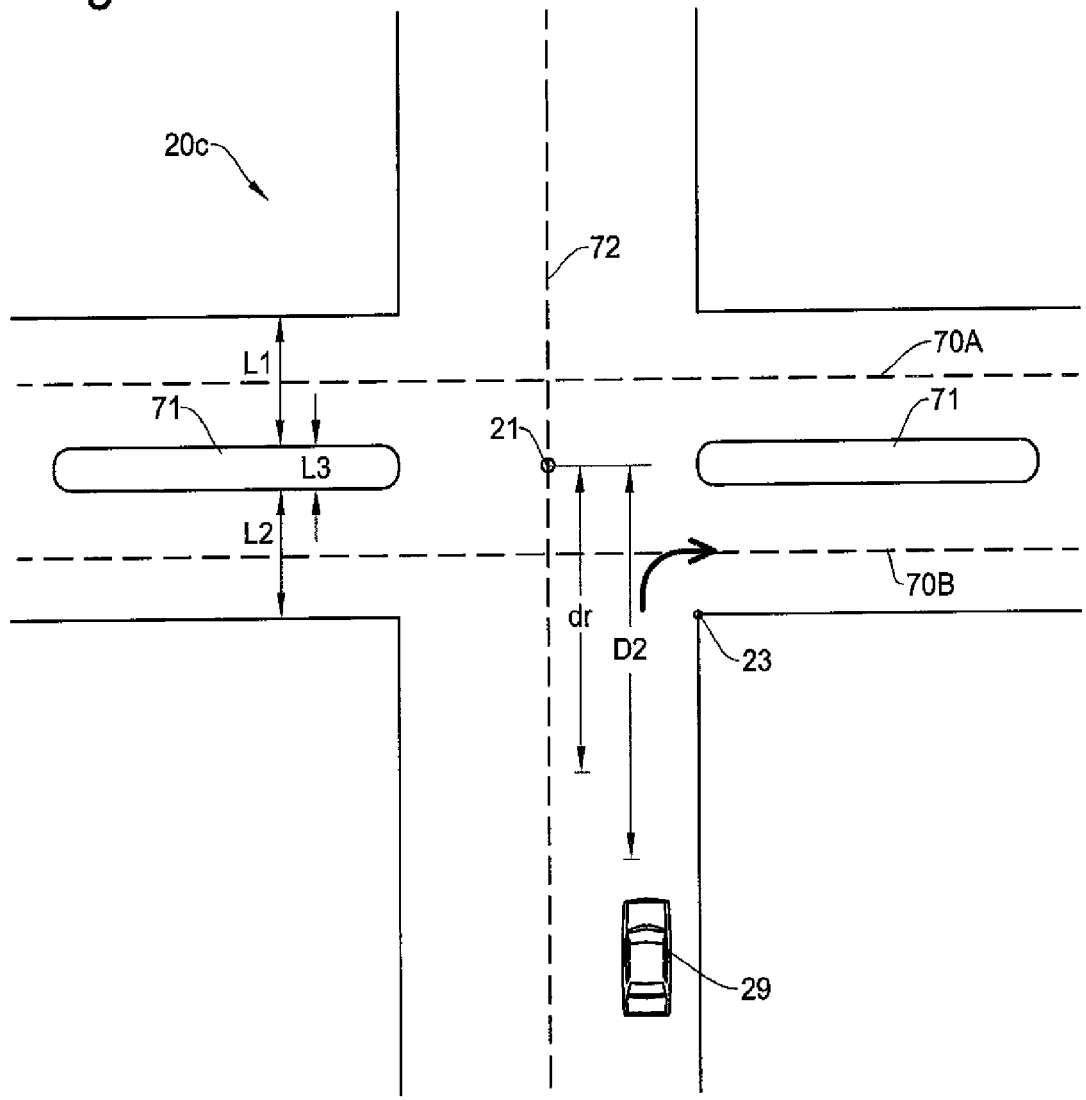

FIGS. 6A and 6B are schematic diagrams showing a situation of intersection wherein the cross street includes a relatively large center divider (road separator bunk) that separates opposing traffic. In the map database industry, such a street is sometimes called a double-digitized road which is a divided road with at least one lane traveling in each of two opposite directions. In the map data, the opposite directions of travel for such a double-digitized road are represented as different road segments.

In the example of FIGS. 6A and 6B, dotted lines represent the road segments associated with the intersection links where a cross street extending in a horizontal direction is a double-digitized road. Road segments 70A and 70B comprise double-digitized road, where the road segment 70A represents a road for the left (west) direction and the road segment 70B represents a road for the right (east) direction. Center dividers (Road separator bunks) 71 are provided at the center of the double-digitized road to separate the roads of opposite directions.

Thus, in the intersection 20c of FIGS. 6A and 6B, the basic difference from the intersection of FIGS. 3A-3C is that (1) the cross street has one lane on each side and (2) the cross street has the center divider 71. Similar to the example of FIGS. 3A-3C, a reference point 21 is shown in FIGS. 6A and 6B which is a center point of the intersection 20c. A reference distance "dr" is predefined with respect to the reference point 21 which is basically the same as that used in FIGS. 2A-2B and 3A-3C to produce the maneuver instruction when the vehicle has arrived at this distance.

A road width L1 represents the width of the road segment 70A, a road width L2 represents the width of the road segment 70B, and L3 represents a width of the center divider 71. The existing map database includes, at least in a certain level, the information regarding the road width L1 and L2 of the road segments and the width L3 of the center divider so that the navigation system is able to retrieve them. A map database in the near future will incorporate such information in a more complete fashion.

FIG. 6A shows the case where the vehicle is going to make a left turn and FIG. 6B shows the case where the vehicle is going to make a right turn. The method of the present invention in the embodiment of FIGS. 6A and 6B determines the distance or timing for announcing the maneuver instruction in a manner more precise than that of FIGS. 3A-3C. This is done by (1) taking a center position of each lane into consideration, and also (2) taking a width of the center divider into consideration.

In FIG. 6A, a final distance "D1" for adjusting a timing of producing a maneuver instruction for a left turn is established with respect to the reference point 21 by changing the reference distance "dr". As indicated by the thick arrow, it is assumed that the vehicle is going to make a left turn toward the center position of the road segment 70A. Thus, since the reference point 21 is a center of the intersection, a half of the road width L1 of the road segment 70A and a half of the width L3 of the center divider 71 are incorporated in adjusting the distance.

Namely, with use of the reference point 21 and the reference distance "dr", the final distance D1 is calculated as follows:

$$D1=dr-(L1/2+L3/2)$$

where L1 is a road width of the road segment 70A and L3 is a width of the center divider 71. It is apparent that if there are two road segments 70A on one side, L1/2 will be modified to L1(1+½) and so on. Accordingly, the navigation system generates the maneuver instruction such as "Make a Left Turn" at the distance D1 away from the reference point 21, which is an appropriate timing, i.e, not too late and not too early.

In FIG. 6B, a final distance "D2" for adjusting a timing of producing a maneuver instruction for a right turn is established with respect to the reference point 21 by changing the reference distance "dr". As indicated by the thick arrow, it is assumed that the vehicle is going to make a right turn toward the center position of the road segment 70B. Thus, since the reference point 21 is a center of the intersection, a half of the road width L2 of the road segment 70B and a half of the width L3 of the center divider 71 are incorporated in adjusting the distance.

Namely, with use of the reference point 21 and the reference distance "dr", the final distance D2 is calculated as follows:

$$D2=dr+(L2/2+L3/2)$$

where L2 is a lane width of the road segment 70B and L3 is the width of the center divider 71. It is apparent that if there are two road segments 70B on one side, L2/2 will be modified to L2(1+½) and so on. Accordingly, the navigation system generates the maneuver instruction such as "Make a Right Turn" at the distance D2 away from the reference point 21, which is an appropriate timing, i.e, not too late and not too early.

In the present invention, it is preferable to also modify the reference distance "dr" dynamically by taking the speed of the vehicle, type of the street being driven on, traffic congestion, weather condition, etc., into consideration. For instance, the reference distance "dr" may be modified such that the higher the speed of the vehicle, the longer the reference distance becomes. Further, the reference distance "dr" may be modified such that if the weather condition is not good (ex. raining), the reference distance becomes longer.

Figure 7:
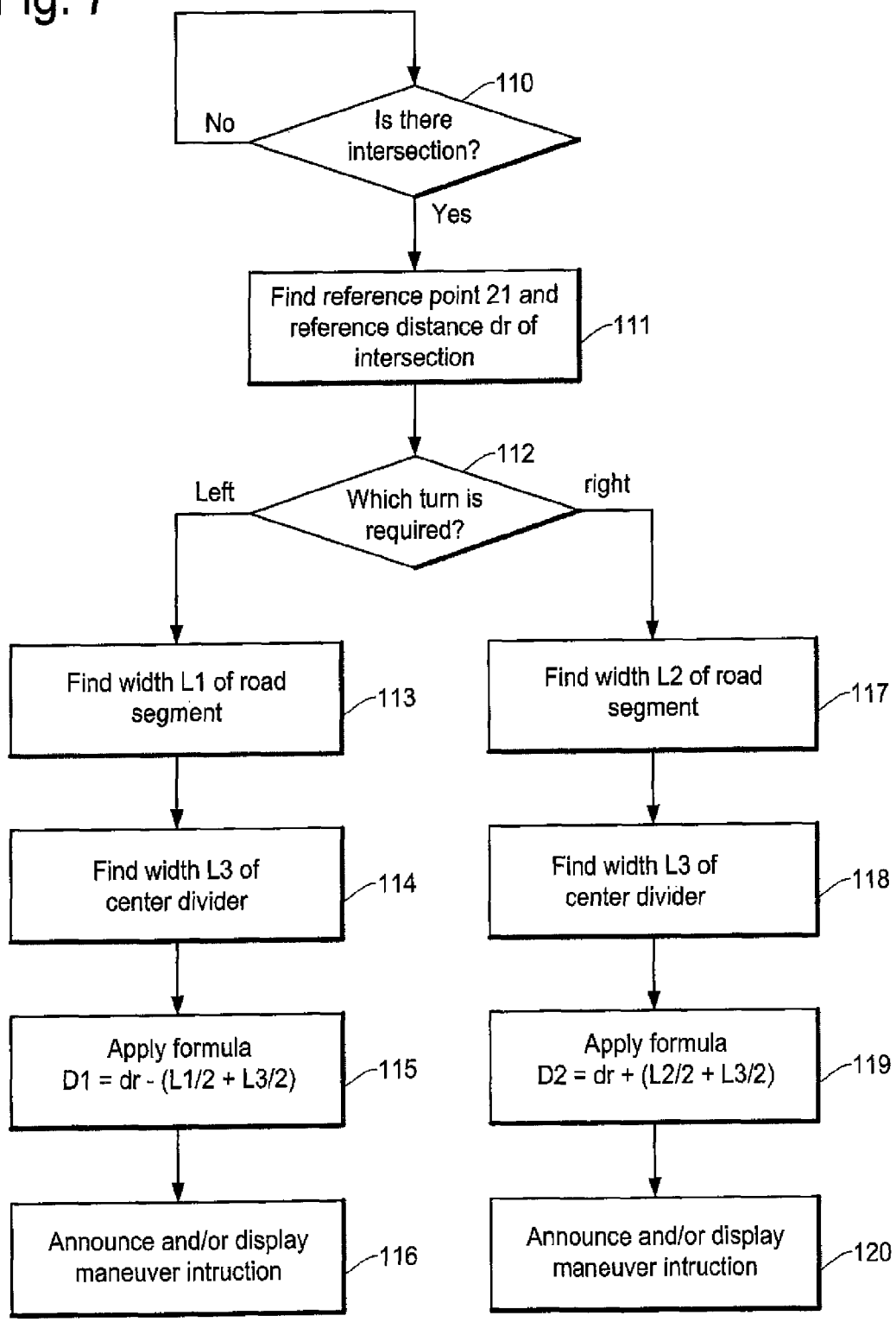
FIG. 7 is a flow chart showing an example of operational steps for adjusting a distance between a reference point and an announcement point in the situation shown in FIGS. 6A and 6B under the present invention.

FIG. 7 is a flow chart summarizing the operational steps described with reference to FIGS. 6A and 6B for distance (timing) adjustment for issuing a maneuver announcement. As noted above, FIGS. 6A and 6B are directed to the situation of intersection wherein at least one cross street is a double-digitized road which includes a relatively large center divider. In the step 110, the navigation system checks whether there is an intersection that requires the user to make a turn on the calculated route to reach the destination.

Such determination is made for a predetermined distance range of the calculated route to the destination ahead of the current vehicle position. The step 110 will be repeated until an intersection that needs to make a turning maneuver will be found on the calculated route. If it is determined that there is an intersection, the navigation system detects a reference point of the intersection and the predetermined reference distance "dr" in the step 111.

Typically, the reference point is a center point of the intersection as shown in FIGS. 6A and 6B, an absolute location of which can be obtained as a form of longitude and latitude data from the map database. The reference distance "dr" is predetermined as described with respect to the conventional technology and it will be adjusted by the present invention based on various factors, vehicle speed, weather condition, etc. In the step 112, the navigation system determines the direction of the turn at the upcoming intersection. If it is a left turn, the process goes to the steps 113-116 and if it is a right turn, the process goes to the steps 117-120.

In the case of left turn, the navigation system detects a width L1 of the road segment 70A in the step 113. The navigation system also detects a width L3 of the center divider 71 in the step 114. In the step 115, the navigation system applies the formula "D1=dr−(L1/2+L3/2)" to obtain the distance D1 with use of the reference point 21 and the reference distance "dr", where L1 is the road width of the road segment 70A and L3 is a width of the center divider 71. Based on the calculation, in the step 116, the navigation system produces the maneuver instruction by voice announcement and/or displaying a mark, icon, etc., for the left turn, when the vehicle reaches the distance D1 from the reference point 21.

In the case of right turn, the navigation system detects a width L2 of the road segment 70B in the step 117. The navigation system also detects a width L3 of the center divider 71 in the step 118. In the step 119, the navigation system applies the formula "D1=dr+(L1/2+L3/2)" to obtain the distance D2 with use of the reference point 21 and the reference distance "dr", where L2 is the road width of the road segment 70B and L3 is a width of the center divider 71. Based on the calculation, in the step 120, the navigation system produces the maneuver instruction by voice announcement and/or displaying a mark, icon, etc., for the right turn, when the vehicle reaches the distance D2 from the reference point 21.

Figure 8:
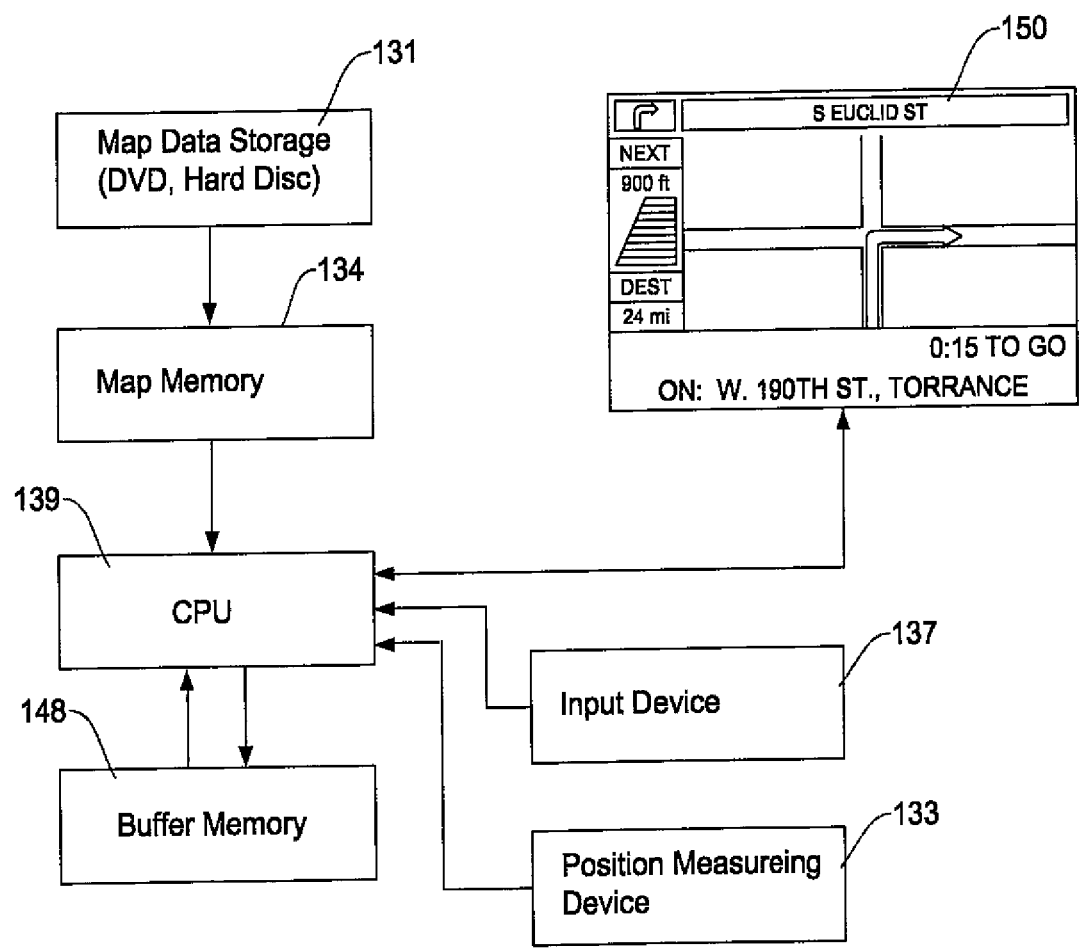
FIG. 8 is a block diagram showing an example of functional structure of the apparatus under the present invention for adjusting a distance thereby producing a maneuver instruction at an appropriate timing.

FIG. 8 is a functional block diagram showing an example of basic structure of the apparatus of the present invention for adjusting the timing (distance) of announcing the maneuver instruction for an upcoming intersection. The structure of FIG. 8 is applicable to any electronic device having a navigation function which enables the electronic device to guide the user to a particular location as noted above. The apparatus of the present invention for the distance and timing adjustment includes a monitor 150 for graphical user interface, and a controller (CPU) 139 for controlling an overall operation of the apparatus of the present invention.

The block diagram of FIG. 8 further includes a map data storage 131 such as a DVD or a hard disc for storing map data, a map memory 134 for storing a required portion of the map data retrieved from the map data storage 131, an input device 137 such as a joystick, a remote controller or other input device for the user to select menus, change directions, scroll the screen, change the location of the cursor on the screen, etc., a position measuring device 133 for detecting a current position of the user, and a buffer memory 148 for storing data concerning the upcoming intersection such as a location of the reference point, number of lanes, width of lane, structure of intersection, functional class of cross street, etc.

In FIG. 8, the apparatus for timing adjustment under the present invention is able to retrieve the map data from the map data storage 131 and the map memory 134. Based on the retrieved map data, the display apparatus displays the map image on the monitor 150 which includes the calculated route to the destination, a current vehicle position, etc. The CPU 139 controls an overall operation of the timing and distance adjustment operation for the turning maneuver under the present invention.

When the navigation system is in the route guidance mode to guide the user to the destination through the calculated route, the CPU 139 determines whether there is an intersection that requires the user to make a turn on the calculated route to reach the destination. If there is an intersection to make a turn, the CPU 139 detects the reference point of the intersection and the reference distance "dr". The CPU 139 also detects the information concerning the intersection such as a direction of turn, a number lanes involved, a width of the lane, a number of lanes, a particular structure of the intersection, a functional class of cross street, etc. After obtaining all the relevant information, the CPU 139 performs a calculation operation and determines the adjusted distance described above with reference to FIGS. 3A-3C and 6A-6B. The CPU 139 instructs to produce the maneuver instruction by voice announcement and/or displaying a mark, icon, etc. when the vehicle reaches the adjusted distance.

Figure 9:
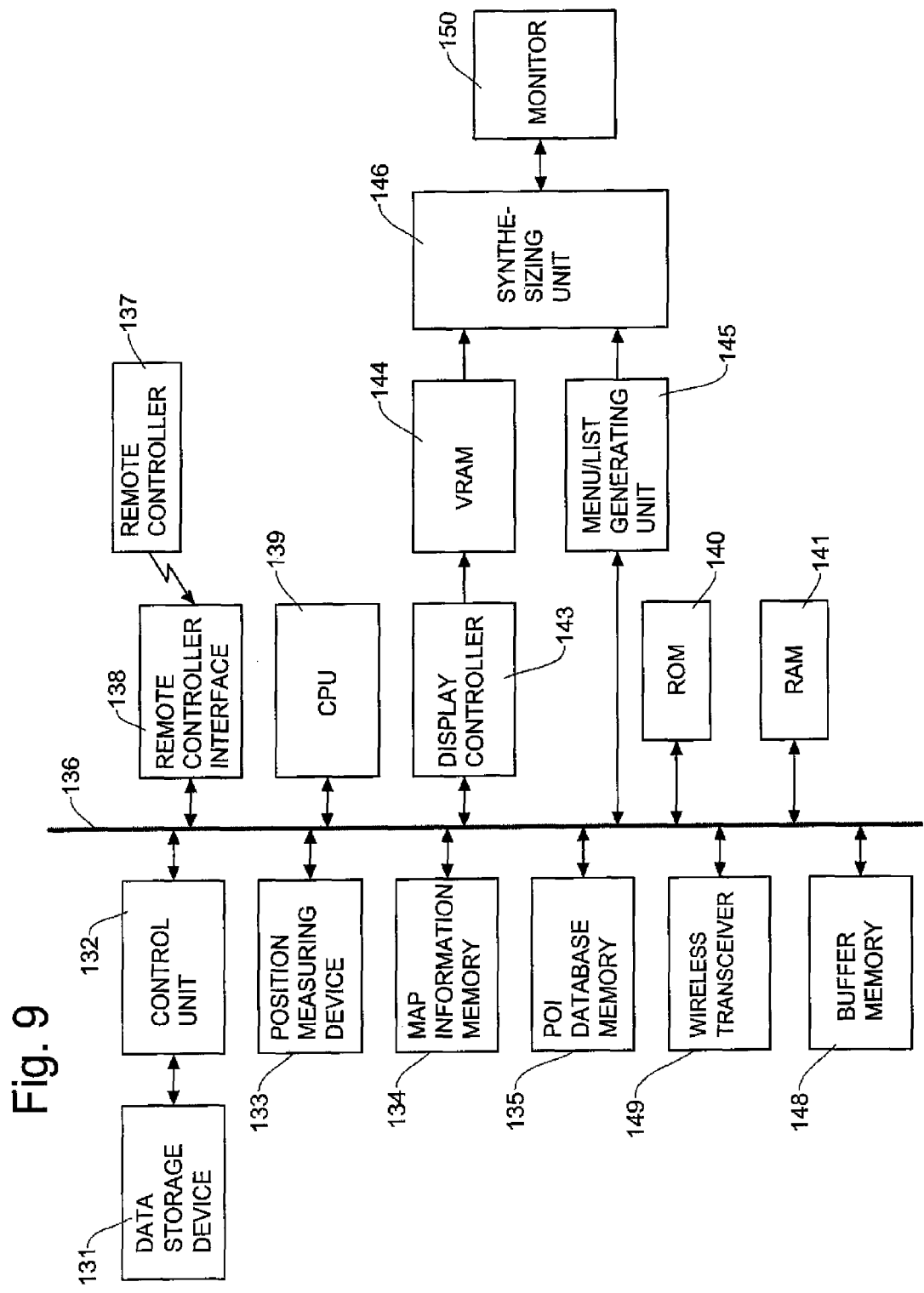
FIG. 9 is a functional block diagram of a vehicle navigation system implementing the method for adjusting a distance thereby producing a maneuver instruction at an appropriate timing.

FIG. 9 shows an example of structure of a vehicle navigation system for implementing distance adjustment method of the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, a wrist watch, a laptop or notebook computer.

In the block diagram of FIG. 9, the functional blocks similar to those of FIG. 8 are denoted by the same reference numerals. The navigation system includes a data storage medium 131 such as a hard disc, CD-ROM, DVD or other storage means for storing the map data. The navigation system includes a control unit 132 for controlling an operation for reading the information from the data storage medium 131, and a position measuring device 133 for measuring the present vehicle position or user position. For example, the position measuring device 133 has a vehicle speed sensor for detecting a moving distance, a gyroscope for detecting a moving direction, a microprocessor for calculating a position, a GPS (global positioning system) receiver for receiving and analyzing GPS signals, and etc.

The block diagram of FIG. 9 further includes a map information memory 134 for storing a portion of the map data relevant to the intended operation of the navigation system which is read from the data storage medium 131, a database memory 135 for storing database information such as point of interest (POI) information which is read out from the data storage medium 131, a remote controller 137 for executing a menu selection operation, cursor movements, an enlarge/reduce operation, a destination input operation, etc. and a remote controller interface 138. Although a remote controller is a typical example for selecting menus, executing selected functions and etc., the navigation system includes various other input methods to achieve the same and similar operations done through the remote controller.

In FIG. 9, the navigation system further includes a bus 136 for interfacing the above functional blocks in the system, a processor (CPU) 139 for controlling an overall operation of the navigation system, a ROM 140 for storing various control programs such as a route search program and a map matching program necessary for navigation control as well as a local brand icon display program for the present invention, a RAM 141 for storing a processing result such as a guide route, a display controller 143 for generating map image (a map guide image and an arrow guide image) on the basis of the map information, a VRAM 144 for storing images generated by the display controller 143, a menu/list generating unit 145 for generating menu image/various list images, a synthesizing unit 146, a wireless transceiver 149 for wireless communication to retrieve data from a remote server, a buffer memory 148 for temporally storing data concerning the upcoming intersection such as a location of the reference point, width of lane, structure of intersection, etc.

The CPU 139 controls an overall operation of the navigation system including the distance adjustment operation under the present invention as described above for producing a maneuver instruction at an appropriate timing. The data related to the distance adjustment will be stored in the buffer memory 148 for further processing. A program that performs the procedure of the present invention including the one shown in the flow charts of FIGS. 5 and 7 may be stored in the ROM 140 or other storage medium and is executed by the CPU 139. Thus, the navigation system is able to produce the maneuver instruction for the intersection at the most appropriate timing.

As has been described above, according to the present invention, the navigation system is able to produce the maneuver instruction for the intersection at the most appropriate timing. During the route guidance operation, the method and apparatus of the present invention adjusts a distance from the reference point of the intersection to the point where the turn instruction will be made by evaluating the information. Such information includes a type of an intersection, a size of the intersection such as a number of lanes, a shape or size of a center divider if any, and a direction of turn such as right turn or left turn, a speed of a vehicle, weather condition, etc. In one embodiment, in addition to the reference distance "dr" incorporated in the conventional technology, the present invention utilizes the adjusted distance "da" so that the maneuver instruction is produced when the vehicle reaches the distance "dr+da" from the reference point. In another embodiment, a specific structure concerning a double-digitized road and its associated data such as a center divider are incorporated to determine the adjusted distance. Thus, the driver is informed to make a turn sufficiently prior to reach the turning point of the intersection but is not too early until reaching the turning point.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A distance adjustment method for a navigation system, comprising the following steps of:
   conducting, by using a central processor unit, a route guidance operation of the navigation system for guiding a user to a destination through a calculated route;
   searching an upcoming intersection on the calculated route that requires the user to make a turn therein within a predetermined distance range ahead from a current position;
   retrieving data concerning the upcoming intersection from a map database;
   retrieving a reference distance from a reference point of the intersection;
   determining an adjusted distance based on a direction of a turning maneuver at the intersection and other relevant information derived from the retrieved data concerning the intersection, which further includes the steps of:
      incorporating a half width of a road segment where one road segment is involved in the intersection;
      incorporating a half width of a center divider of the intersection;
      either adding or subtracting the half width of the road segment and the center divider from the reference distance depending on the direction of the turning maneuver;
   establishing a final distance from the reference point of the intersection by incorporating the adjusted distance; and
   generating a maneuver instruction at a timing when the user has reached the final distance from the reference point of the intersection, thereby notifying the user to make the turning maneuver at the intersection;
   wherein the adjusted distance is greater than zero.

2. A distance adjustment method for a navigation system as defined in claim 1, wherein the final distance from the reference point of the intersection is adjusted depending on a direction of the turning maneuver at the intersection.

3. A distance adjustment method for a navigation system as defined in claim 1, wherein the final distance from the reference point of the intersection is adjusted depending on a direction of the turning maneuver at the intersection and a number of lanes involved in the intersection with use of the retrieved data concerning the intersection, and wherein the number of lanes is greater than one.

4. A distance adjustment method for a navigation system as defined in claim 1, wherein the final distance from the reference point of the intersection is adjusted depending on a direction of the turning maneuver at the intersection and a number of lanes involved in the intersection and a width of each lane with use of the retrieved data concerning the intersection.

5. A distance adjustment method for a navigation system as defined in claim 1, further comprising a step of obtaining the adjusted distance based on a direction of the turning maneuver at the intersection and other relevant information derived from the retrieved data concerning the intersection, and a step of combining the reference distance and the adjusted distance to obtain the final distance.

6. A distance adjustment method for a navigation system as defined in claim 5, wherein said step of obtaining the adjusted distance includes a step of detecting a number of lanes involved in the intersection and a width of each lane from the retrieved data, and a step of multiplying the number of lanes and the width of the lane.

7. A distance adjustment method for a navigation system as defined in claim 1, wherein the adjusted distance equals to the half width of the road segment plus the half width of the center divider.

8. A distance adjustment method for a navigation system as defined in claim 7, wherein said step of establishing the final distance from the reference point of the intersection includes a step of subtracting the adjusted distance from the reference distance when making a left turn and adding the adjusted distance to the reference distance when making a right turn.

9. A distance adjustment method for a navigation system as defined in claim 5, wherein the reference distance is modified by evaluating various factors including a vehicle speed, traffic congestion, and weather condition.

10. A distance adjustment apparatus for a navigation system, comprising:
    a data storage device which stores map data related to operations of the navigation system;
    a monitor for displaying information and images related to the operations of the navigation system including selection of a start point and a destination, and route guidance to the destination;
    a position measuring device for measuring a current position of a user or a user's vehicle carrying the navigation system and determining a distance between a point defined by the map data and the current position; and
    a central processing unit for controlling overall operations of the navigation system including retrieving the map data from the data storage device, establishing a calculated route between the start point and the destination, and guiding a user to the destination;
    wherein the central processing unit is configured to control the following operations of:
    conducting a route guidance operation of the navigation system for guiding a user to a destination through a calculated route;
    searching an upcoming intersection on the calculated route that requires the user to make a turn therein within a predetermined distance range ahead from the current position determined by the position measuring device;
    retrieving data concerning the upcoming intersection from a map database;
    retrieving a reference distance from a reference point of the intersection;
    determining an adjusted distance based on a direction of a turning maneuver at the intersection and other relevant information derived from the retrieved data concerning the intersection, which further includes:
       incorporating a half width of a road segment where one road segment is involved in the intersection;
       incorporating a half width of a center divider of the intersection;
       either adding or subtracting the half width of the road segment and the center divider from the reference distance depending on the direction of the turning maneuver;
    establishing a final distance from the reference point of the intersection by incorporating the adjusted distance; and
    generating a maneuver instruction at a timing when the user has reached the final distance from the reference point of the intersection, thereby notifying the user to make the turning maneuver at the intersection;
    wherein the adjusted distance is greater than zero.

11. A distance adjustment apparatus for a navigation system as defined in claim 10, wherein the final distance from the reference point of the intersection is adjusted depending on a direction of the turning maneuver at the intersection.

12. A distance adjustment apparatus for a navigation system as defined in claim 10, wherein the final distance from the reference point of the intersection is adjusted depending on a direction of the turning maneuver at the intersection and a number of lanes involved in the intersection with use of the retrieved data concerning the intersection, and wherein the number of lanes is greater than one.

13. A distance adjustment apparatus for a navigation system as defined in claim 10, wherein the final distance from the reference point of the intersection is adjusted depending on a direction of the turning maneuver at the intersection and a number of lanes involved in the intersection and a width of each lane with use of the retrieved data concerning the intersection.

14. A distance adjustment apparatus for a navigation system as defined in claim 10, wherein the central processing unit is further configured to control operations of obtaining the adjusted distance based on a direction of the turning maneuver at the intersection and other relevant information derived from the retrieved data concerning the intersection, and combining the reference distance and the adjusted distance to obtain the final distance.

15. A distance adjustment apparatus for a navigation system as defined in claim 14, wherein the central processing unit is further configured to control operations of detecting a number of lanes involved in the intersection and a width of each lane from the retrieved data, and multiplying the number of lanes and the width of the lane.

16. A distance adjustment apparatus for a navigation system as defined in claim 10, wherein the adjusted distance equals to the half width of the road segment plus the half width of the center divider.

17. A distance adjustment apparatus for a navigation system as defined in claim 16, the central processing unit is further configured to control an operation of subtracting the adjusted distance from the reference distance when making a left turn and adding the adjusted distance to the reference distance when making a right turn.

18. A distance adjustment apparatus for a navigation system as defined in claim 14, wherein the reference distance is modified by evaluating various factors including a vehicle speed, traffic congestion, and weather condition.

* * * * *